US006723148B2

United States Patent
Stass

(10) Patent No.: US 6,723,148 B2
(45) Date of Patent: Apr. 20, 2004

(54) MOLDABLE TWIST LOCK SNAP FIT DESIGN FOR PLASTIC AIR CLEANER

(75) Inventor: Arden Stass, Chatham (CA)

(73) Assignee: Siemens VDO Automotive, Inc., Chatham (CA)

( * ) Notice: Subject to any disclaimer, the term of this patent is extended or adjusted under 35 U.S.C. 154(b) by 102 days.

(21) Appl. No.: 09/990,034

(22) Filed: Nov. 21, 2001

(65) Prior Publication Data

US 2002/0069625 A1 Jun. 13, 2002

Related U.S. Application Data

(60) Provisional application No. 60/254,245, filed on Dec. 8, 2000.

(51) Int. Cl.[7] .......................... B01D 35/30; B01D 46/00
(52) U.S. Cl. ........................ 55/385.3; 55/493; 55/497; 55/503; 55/511; 123/198 E
(58) Field of Search ................. 55/385.3, 493, 55/495, 497, 502, 503, 511, DIG. 28; 123/198 E; 220/326

(56) References Cited

U.S. PATENT DOCUMENTS

| | | | |
|---|---|---|---|
| 3,825,110 A | | 7/1974 | Halbich et al. |
| 4,386,949 A | * | 6/1983 | Bassi .................... 55/385.1 |
| 4,743,281 A | | 5/1988 | Kennedy et al. |
| 4,782,561 A | | 11/1988 | Hayama |
| 5,295,602 A | | 3/1994 | Swanson |
| 5,569,311 A | * | 10/1996 | Oda et al. ................. 55/503 |
| 5,570,751 A | * | 11/1996 | Courtwright et al. ... 123/198 E |
| 5,613,759 A | | 3/1997 | Ludwig et al. |
| 5,947,462 A | | 9/1999 | Roussel |
| 6,125,501 A | * | 10/2000 | Yip ........................ 55/503 |
| 6,174,343 B1 | * | 1/2001 | Bloomer ................. 55/385.3 |
| 6,406,508 B1 | * | 6/2002 | Bloomer ................. 55/385.3 |
| 6,513,481 B2 | * | 2/2003 | Stass et al. ............. 123/198 E |

OTHER PUBLICATIONS

International Search Report completed Feb. 26, 2001.
U.S. PTO application No. 09/664,809, filed Sep. 19, 2000, entitled "Torsional Snap Fit Connector for Air Filter Cover".

* cited by examiner

Primary Examiner—Duane Smith
Assistant Examiner—Jason M. Greene

(57) ABSTRACT

An air induction system comprises flow body (32) and a filter housing (20). The filter housing (20) has a first housing portion (36) and a second housing portion (40) in communication with the air flow body (32). A filter (44) is disposed in the filter housing (20). A connector comprises a wing (54) mounted to a post (70) extending from the first housing portion (36) and a slot (56) on the second housing portion (40). (FIG. 4). The first housing portion (36) has at least one cutout (60) adjacent post (72). (FIG. 4).

12 Claims, 5 Drawing Sheets

MOLDABLE TWIST LOCK SNAP FIT DESIGN FOR PLASTIC AIR CLEANER

This application claims priority to Provisional Patent Application Ser. No. 60/254,245 filed on Dec. 8, 2000.

BACKGROUND OF THE INVENTION

This invention relates to an air induction system employing a moldable snap fit connector for a filter housing cover.

Air induction systems are used to provide clean air to a vehicle's engine. Such systems generally comprise a flow body, a filter housing and an air filter. Air is received into the flow body through an air intake and passes into the filter housing through a filter. The filter removes contaminants and particles that may otherwise interfere with the operation of the vehicle engine. Clean air then passes to the engine to combine with fuel in the combustion chamber.

The filter housing typically comprises two halves that sandwich a filter between them. Frequently, a bolt on one half fits into a hole in another half. A wing-nut then tightens the two halves together, allowing for their assembly and disassembly by tightening and untightening the wing-nut. Vibrations experienced by the air induction system in the vehicle may cause the wing-nut to loosen, thereby loosening the filter within the housing.

One recent proposed connector comprises a snap fit connection that has a wing on a post on one half of the filter housing and a slot on the other half. The wing twists into the slot and untwists following its passage through the slot, thereby creating an overlap between the wing and a portion of the space adjacent the slot. This current design provides benefits, but it would be desirable to simplify the molding of the features of the wing.

A need therefore exists for a moldable connector to be used with an air induction system.

SUMMARY OF THE INVENTION

The present invention comprises an air induction system having an airflow body, a filter housing, a filter, and a snap fit connector. Like the above mentioned connector, the inventive connector has a wing on a post extending from one half of the housing and a slot to receive the wing on the other housing.

The invention has a cutout adjacent to the post to facilitate the molding of the wing's features. The invention accordingly provides a moldable snap fit connection for a filter housing.

A guide may be employed to twist the wing into the slot. The guide may be a ramp. Once the wing passes through the slot, the wing is no longer guided and returns to its untwisted position. In this untwisted position, the wing overlaps a portion of the housing having the slot.

Thus, the wing and slot combine to sandwich a filter between the housing halves. The wing itself may be in the shape of a blade.

Moreover, the invention may comprise a filter housing for an air induction system. The housing has two halves. A filter is sandwiched between the halves. A connector comprises a wing on a post and extends from one of the halves. Cutouts are adjacent the post to permit molding of the wing's features. A guide on the other half causes the wing to twist into the slot. The wing untwists once through, locking the halves together. The wing may overlay a portion of the housing with the slot.

The post has a first portion extending laterally outwardly from a flange portion of the housing. The post also has a second portion extending at an angle with a substantial portion generally perpendicular to the first portion such that cutouts are provided by sides of the housing.

The wing has a relaxed position generally extending along a first line. The slot extends along a second line, non-parallel to the first line so that the wing moves through the slot and twists away from the relaxed position.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
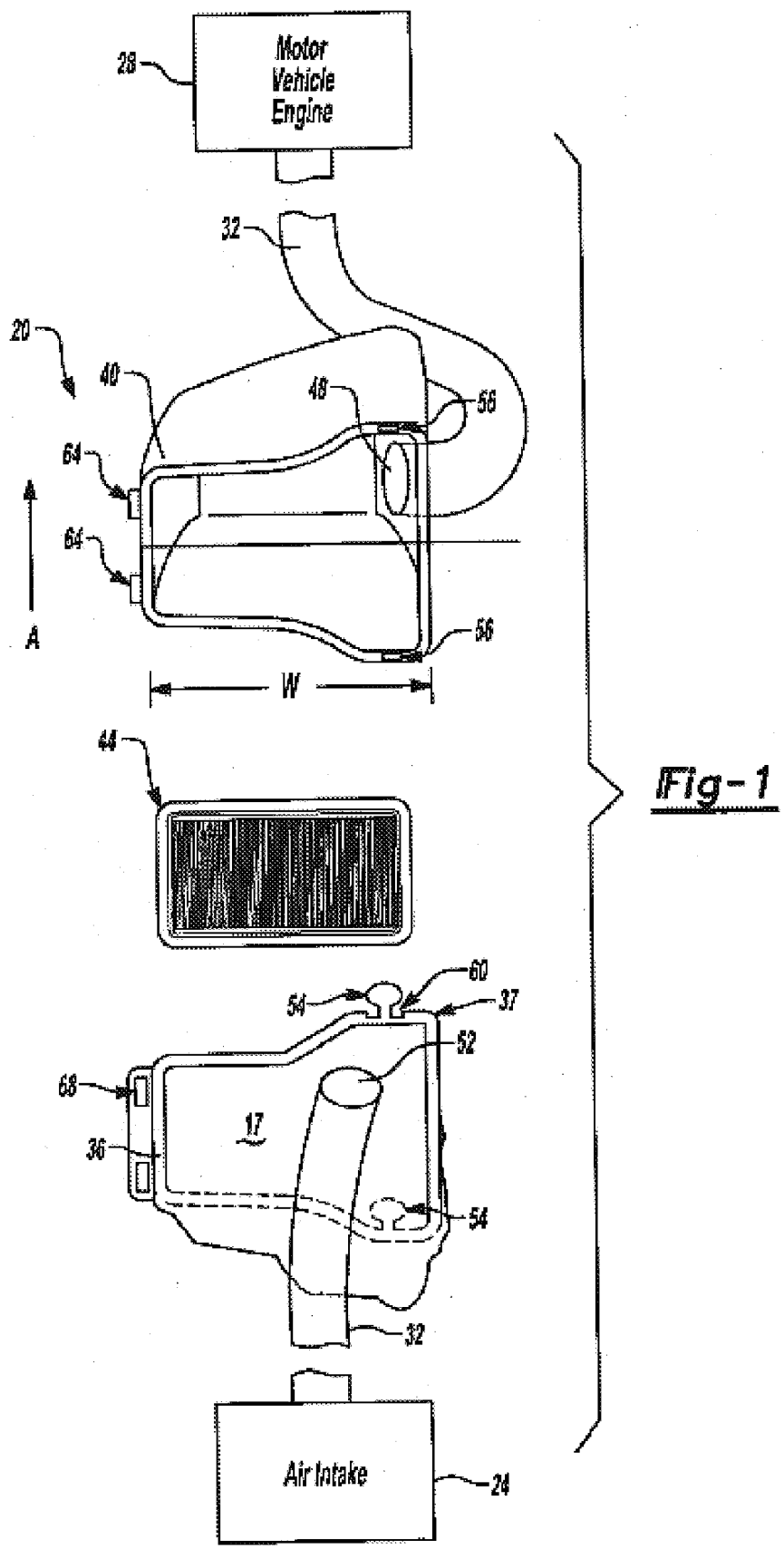
FIG. 1 illustrates an embodiment of the invention in its environment, including air flow body, filter housing, filter, and wing connector.

FIG. 1 illustrates an embodiment of the invention in its environment. Shown are filter housing 20 comprising first portion 36 and second portion 40. As known, first housing portion 36 and second housing portion 40 sandwich air filter 44 when these portions are locked together. Air is received into air intake 24 and passes through air flow body 32 through opening 52 into first housing portion 36. Air is then cleaned by air filter 44 and passes through opening 48 of second housing portion 40 into air flow body 32 and ultimately to motor vehicle engine 28. Unlike existing filter housings that employ a bolt and wing-nut to secure the housing portions together, the invention here employs a connector comprising wings 54 and slots 56. Moreover, cutouts 60 are formed on first housing portion 36, to allow the wings 54 to be easily molded through conventional plastic molding processes. Flange 37 of first housing portion 36 has portions removed to allow underside of wing 54 to be formed by molding.

Figure 2:
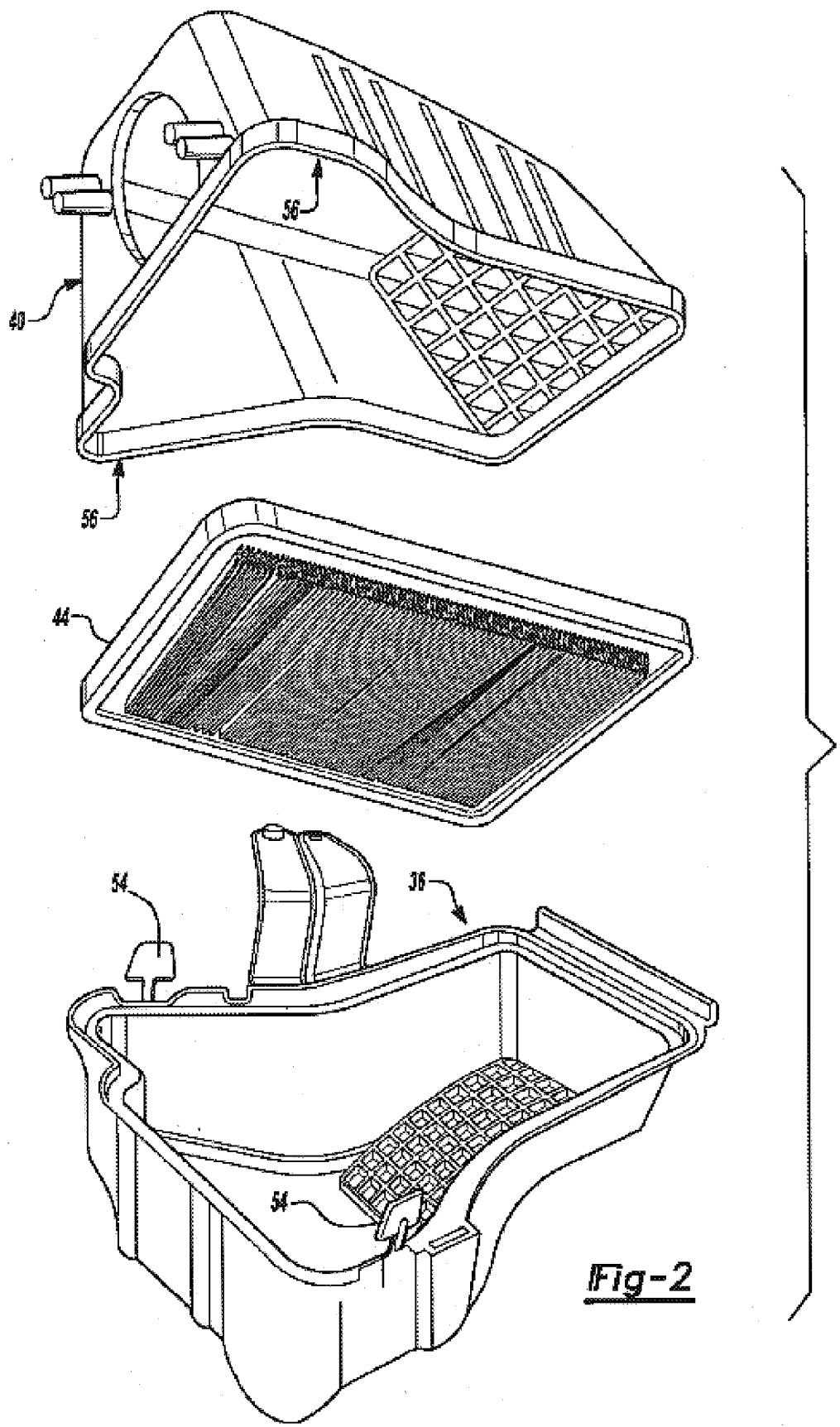
FIG. 2 illustrates another view of the filter housing of FIG. 1.
Figure 3:
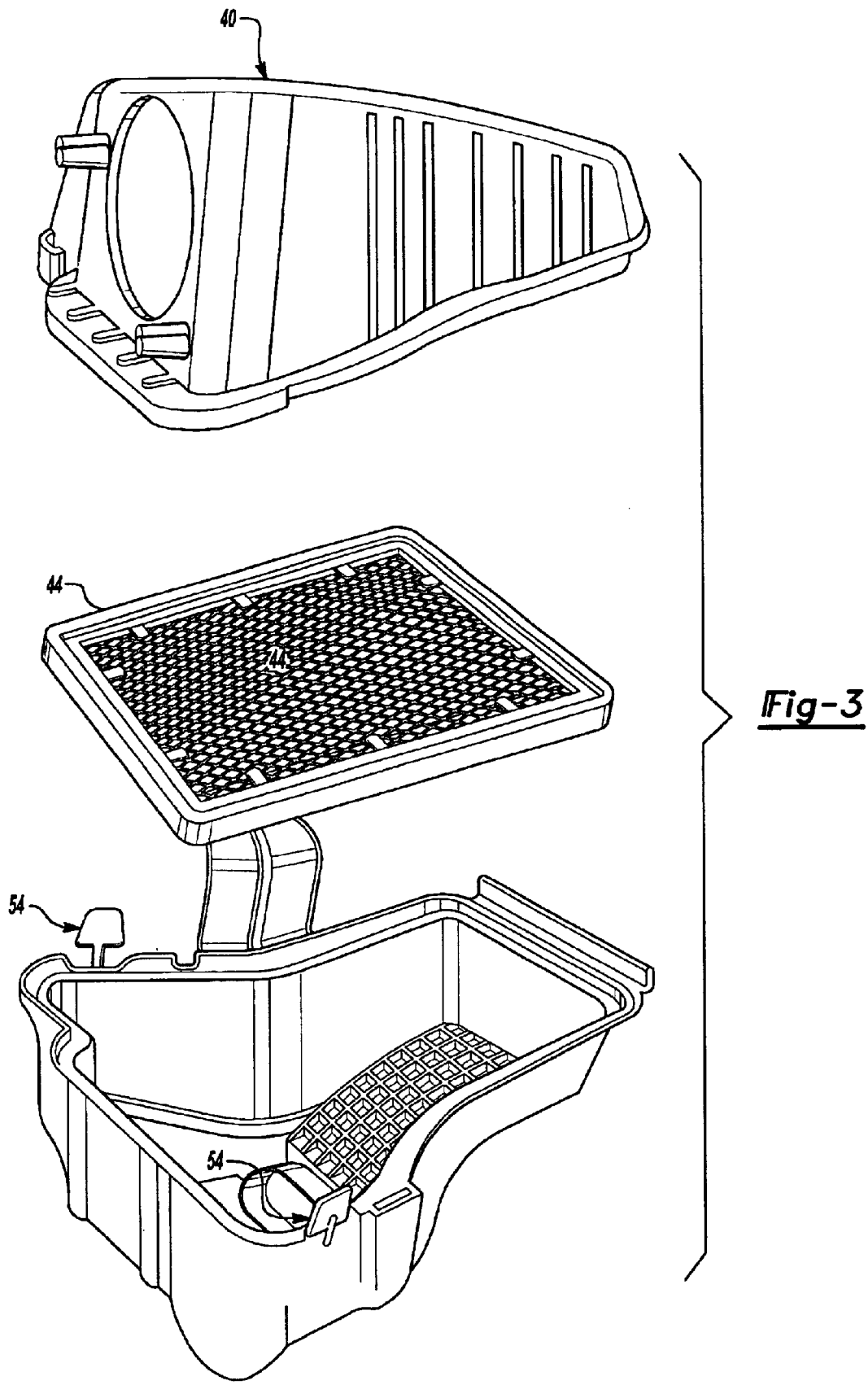
FIG. 3 illustrates another view of the same filter housing.

FIGS. 2 and 3 illustrate another view of the filter housing 20 of FIG. 1. Filter housing 20 comprises a first housing portion 36 and second housing portion 40. Wings 54 are molded to first housing portion 36 while slots 56 are on second housing portion 40 to receive wings 54. Here, it is also seen that filter 44 is sandwiched between first housing portion 36 and second housing portion 40 following the placement of wings 54 into slots 56.

Figure 4:
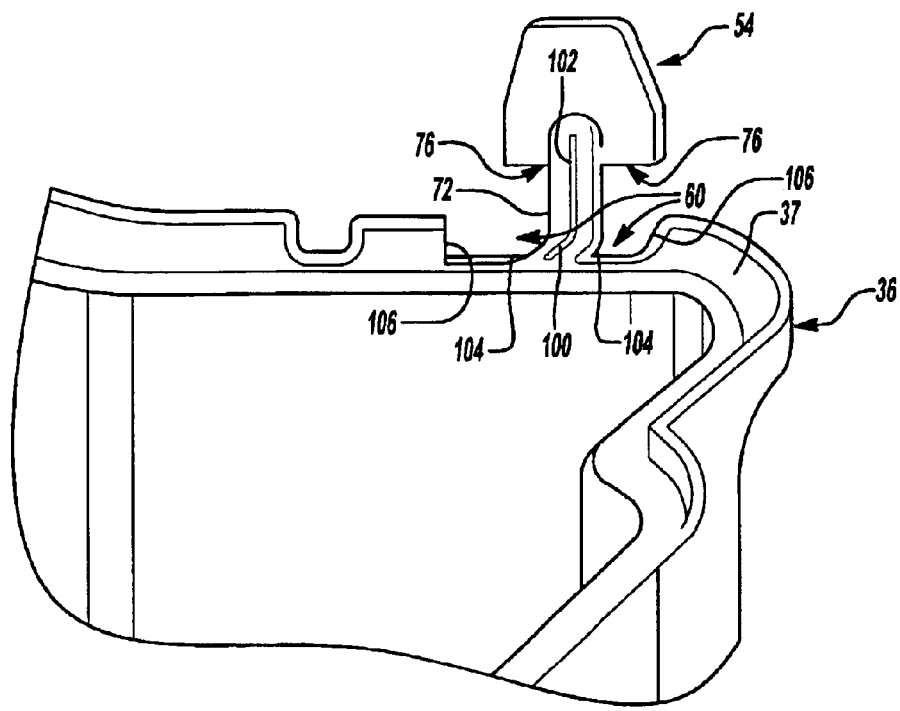
FIG. 4 illustrates the wing connector including wing, post, and cutout.

FIG. 4 illustrates in detail wings 54 and first housing portion 36 of the previous figures. Wing 54, such as in the shape of a blade, is connected to first housing portion 36 by post 72. Wing 54 has the shape of a blade. In contrast to the prior art, the first housing portion 36 has at least one cutout 60 adjacent post 72. Cutouts 60 allow wing 54 to be easily molded to have shoulders 76. Cutouts 60 greatly simplify the molding process because they permit shoulder 76 to be molded in the same line of draw as the other features of the filter housing.

As can be appreciated from FIG. 4, the cutouts 60 provide a laterally outwardly extending portion 100 of the post 72 which leads to an axially extending portion 102, which extends at an angle generally perpendicular to the section 100. As can be seen, edges 104 of the post portion 100 are spaced from edges 106 in the flange 37. This provides the cutouts, and simplifies the molding process.

Figure 5:
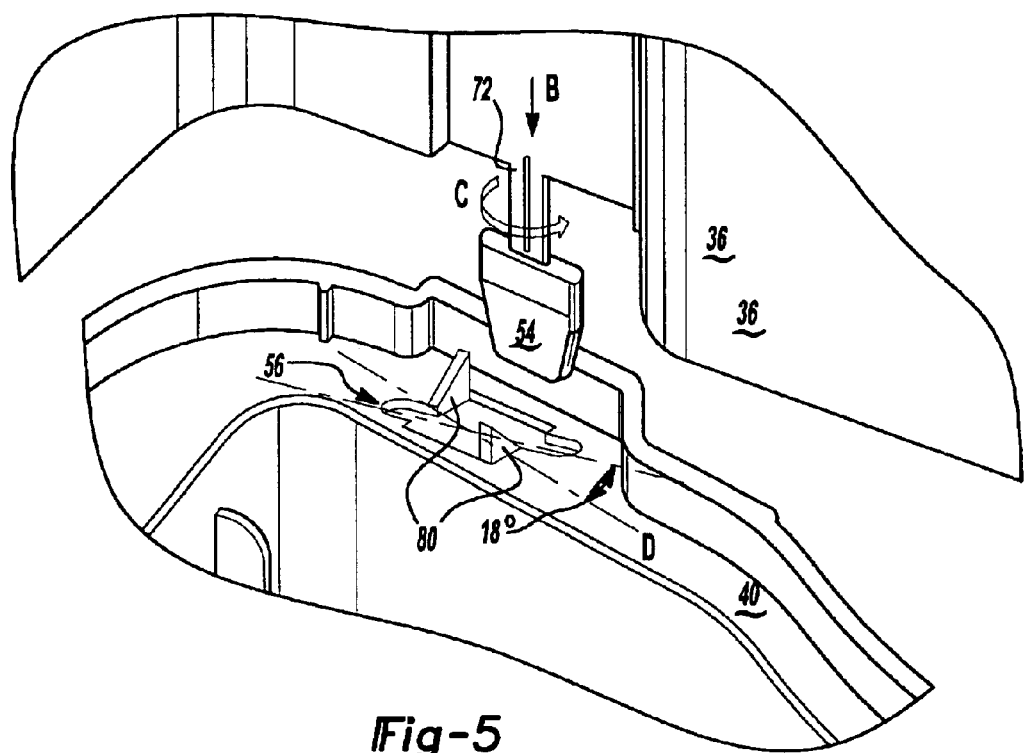
FIG. 5 illustrates the receiving of the wing into a slot.

FIG. 5 illustrates how wing 54 fits into slot 56. As can be seen in this figure, wing 54 moves in the direction of arrow B towards slot 56. If untwisted, wing 54 would unsuccessfully attempt to enter slot 56 along line D. That is, wing 54 extends (along line D) in a relaxed position at an angle relative to slot 56 when first housing portion 36 and second housing portion 40 are brought together. Line D is transverse to slot 56 as illustrated, in one embodiment 18° to slot 56. Thus, to guide wing 54 into slot, guides or ramps 80, contact wing 54 and cam wing 54, causing post and wing 54 to twist in the direction of arrow C. If slot 56 is 18° transverse to line D, then wing 54 twists 18° to permit wing 54 to be received by slot 56.

Figure 6:
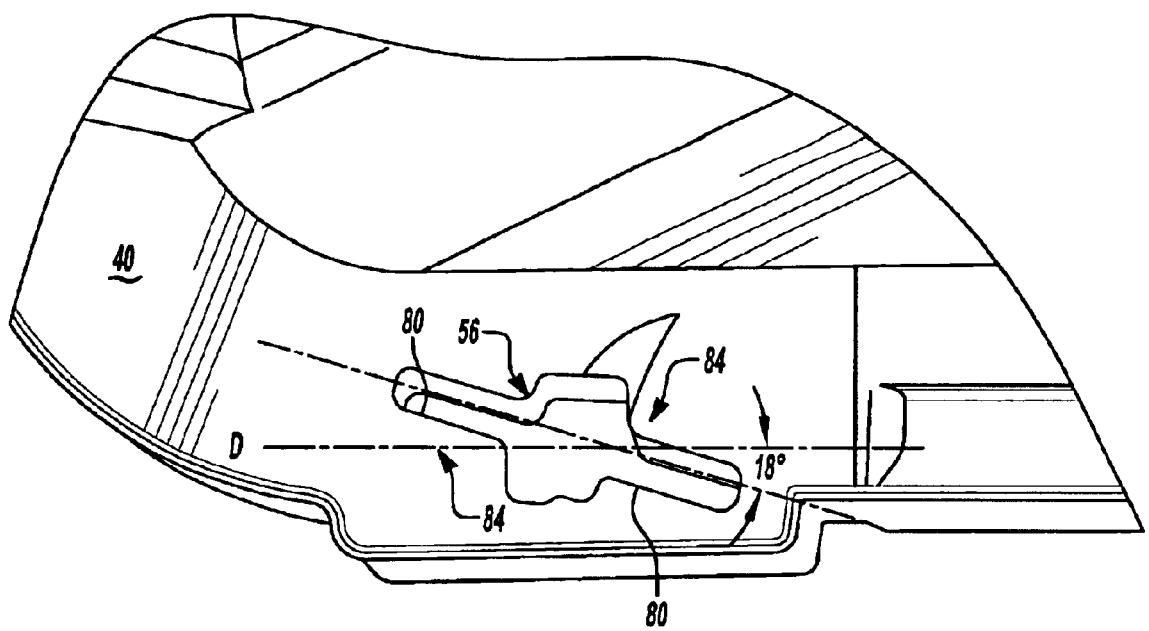
FIG. 6 illustrates an alternative view of the slot, highlighting overlap portions of the filter housing that contact the wing following its passage through the slot.
Figure 7:
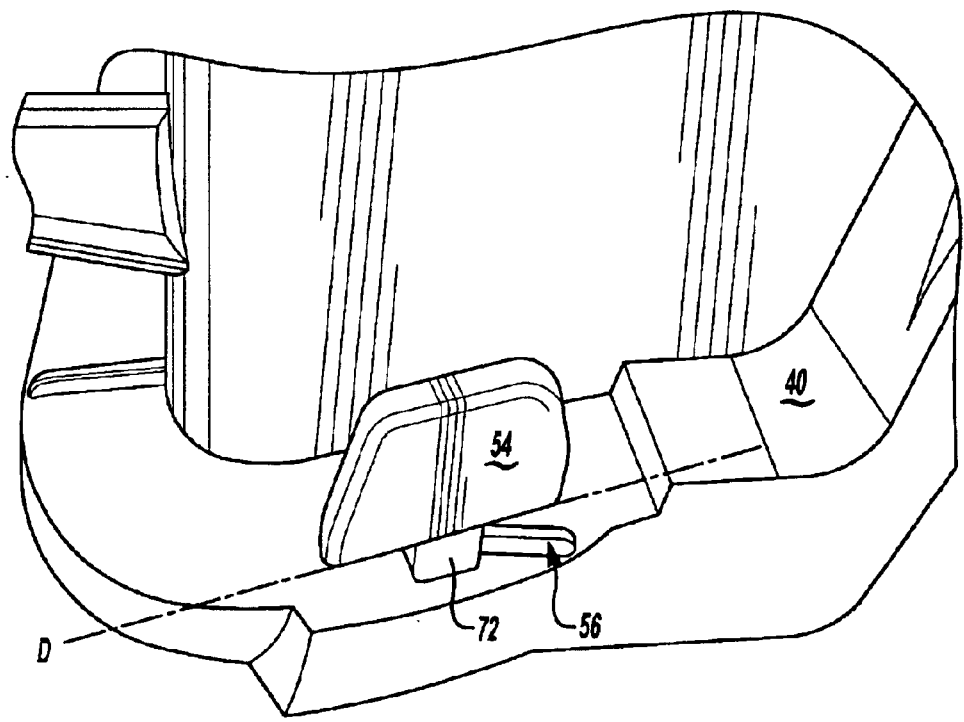
FIG. 7 illustrates the wing through slot.

As shown in FIGS. 6 and 7, once wing 54 passes through guides 80, wing 54 will untwist in an opposite direction to arrow C (FIG. 6) so as to cause shoulder 76 to overlap portions of second housing portion 40 in areas 84. Thus, shoulders 76 overlap areas 84, locking first housing portion 36 to second housing portion 40 as shown in FIG. 6.

Thus, wing 54 twists and snaps into slot 56. Cutouts 60 permit wing 54 to be molded with no additional actions or complexities in the injection mold tools. To disengage the connector, wing 54 may be twisted in a direction to line the edge of the wing with the slot 56, opposite the direction of arrow C of FIG. 5, and then pushing wing 54 through slot 56.

A significant advantage of this connector is that it is under load at two opposing ends of the wing. Thus, post is not bent. By loading in this manner, the wing tends to have better retention because the plastic tends to creep under load.

The key design features for serviceability of the filter housing are the blade size and the thickness of the stem that must be twisted to open the connector. The wing should be large enough to allow the wing to be twisted by hand. The post should be thin enough to permit easy twisting of wing.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An air induction system comprising:
    an air flow body;
    a filter housing comprising a first housing portion and a second housing portion in communication with said air flow body;
    a filter disposed in said filter housing; and
    a connector comprising a wing mounted to a post extending from said first housing portion and a slot to receive said wing on said second housing portion wherein said first housing portion has at least one cutout adjacent said post wherein said second housing portion has at least one guide to direct said wine into said slot; and
    wherein said guide causes said wing to move in a first direction into said slot, said wing moving in a second direction opposite said first direction once through said slot.

2. The air induction system of claim 1 wherein said wing overlies said second housing portion following its passing through said slot.

3. An air induction system comprising:
    an air flow body;
    a filter housing comprising a first housing portion and a second housing portion in communication with said air flow body;
    a filter disposed in said filter housing; and
    a connector comprising a wing mounted to a post extending from said first housing portion and a slot to receive said wine on said second housing portion wherein said first housing portion has at least one cutout adjacent said post; and
    wherein said post has a first portion extending laterally outwardly from a flange portion of said first housing portion, said post having a second portion extending at an angle with a substantial component generally perpendicular to said first portion, such that said cutouts are provided by sides of said first portion being spaced by said cutout from an opposed side of said flange.

4. An air induction system comprising:
    an air flow body;
    a filter housing comprising a first housing portion and a second housing portion in communication with said air flow body;
    a filter disposed in said filter housing; and
    a connector comprising a wing mounted to a post extending from said first housing portion and a slot to receive said wing on said second housing portion wherein said first housing portion has at least one cutout adjacent said post; and
    wherein said wing has a relaxed position generally extending along a first line, and said slot extending along a second line, non-parallel to said first line such that as said wing moves through said slot, said wing is twisted away from said relaxed position.

5. An air filter housing for an air induction system comprising:
    a filter housing comprising a first housing portion and a second housing portion;
    a filter disposed in said filter housing; and
    a connector comprising a wing mounted to a post extending from said first housing portion and a slot to receive said wing on said second housing portion wherein said first housing portion has at least one cutout adjacent said post, wherein said second housing portion has at least one guide to direct said wing into said slot; and
    wherein said post has a first portion extending laterally outwardly from a flange portion of said first housing portion, said post having a second portion extending at an angle with a substantial component generally perpendicular to said first portion, such that said cutouts are provided by sides of said first portion being spaced by said cutout from an opposed side of said flange.

6. An air filter housing for an air induction system comprising:
    a filter housing comprising a first housing portion and a second housing portion;
    a filter disposed in said filter housing; and a connector comprising a wing mounted to a post extending from said first housing portion and a slot to receive said wing on said second housing portion wherein said first housing portion has at least one cutout adjacent said post, wherein said second housing portion has at least one guide to direct said wing into said slot; and wherein said guide causes said wing to twist in a first direction into said slot, said wing twisting in a second direction opposite said first direction once through said slot.

7. The air filter housing of claim 5 wherein said wing overlies said second portion following its passing through said slot.

8. An air filter housing for an air induction system comprising:

a filter housing comprising a first housing portion and a second housing portion;

a filter disposed in said filter housing; and a connector comprising a wing mounted to a post extending from said first housing portion and a slot to receive said wing on said second housing portion wherein said first housing portion has at least one cutout adjacent said post, wherein said second housing portion has at least one guide to direct said wing into said slot; and wherein said wing has a relaxed position generally extending along a first line, and said slot extending along a second line, non-parallel to said first line such that as said wing moves through said slot, said wing is twisted away from said relaxed position.

9. An air filter housing for an air induction system comprising:

a filter housing comprising a first housing portion and a second housing portion;

a filter disposed in said filter housing; and a connector comprising a wing on a post extending from said first housing portion and a slot to receive said wing on said second housing portion wherein said first housing portion has at least one cutout adjacent said post, wherein said second housing portion has at least one guide to direct said wing into said slot, and wherein said guide causes said wing to twist in a first direction into said slot, said wing twisting in a second direction opposite said first direction once through said slot.

10. The air filter housing of claim 9 wherein said wing overlies said second portion following its passing through said slot.

11. The air filter housing of claim 9 wherein said post has a first portion extending laterally outwardly from a flange portion of said first housing portion, said post having a second portion extending at an angle with a substantial component generally perpendicular to said first portion, such that said cutouts are provided by sides of said first portion being spaced by said cutout from an opposed side of said flange.

12. The air filter housing of claim 9 wherein said wing has a relaxed position generally extending along a first line, and said slot extending along a second line, non-parallel to said first line such that as said wing moves through said slot, said wing is twisted away from said relaxed position.

* * * * *